Nov. 17, 1970 G. R. COGAR ET AL 3,541,548
AUDIBLE ACTION ALARM CIRCUIT
Original Filed March 30, 1966
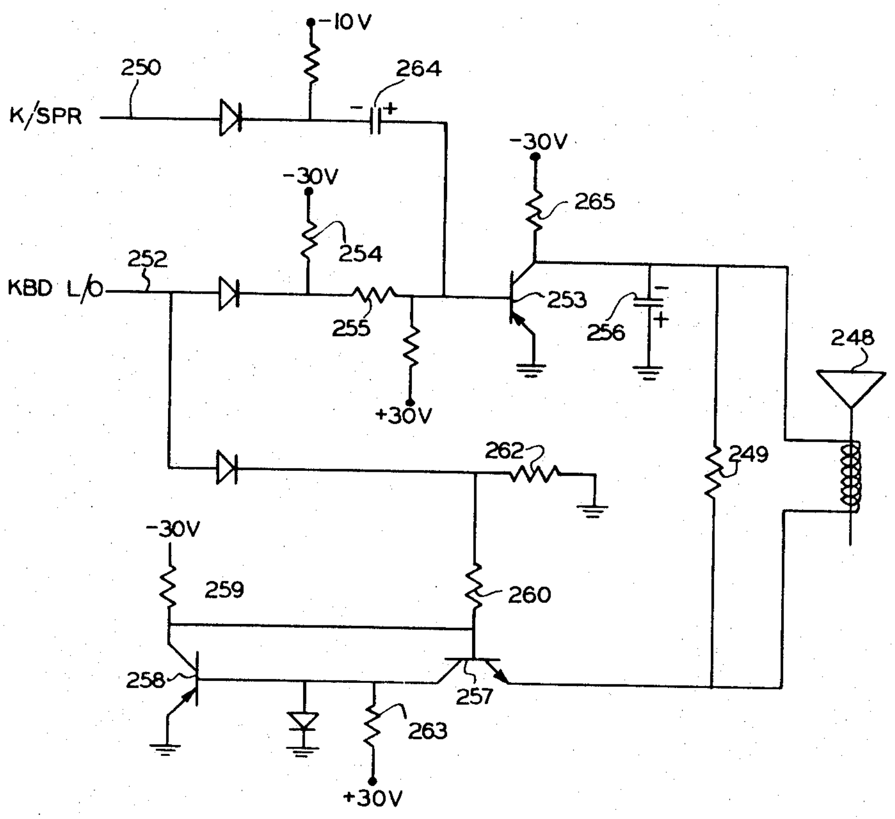
GEORGE R. COGAR
TORKJELL SEKSE
WALTER BANZIGER
JOSEPH W. MING
LASZLO HORVATH
INVENTORS.
BY Richard H. Smith
Attorneys United States Patent Office 3,541,548

Patented Nov. 17, 1970

3,541,548

AUDIBLE ACTION AND ALARM CIRCUIT

George R. Cogar, Frankfort, Torkjell Sekse, Marcy, Walter Banziger and Joseph W. Ming, Utica, and Laszlo Horvath, Ilion, N.Y., assignors to Mohawk Data Sciences Corporation, Herkimer, N.Y., a corporation of New York Original application Mar. 30, 1966, Ser. No. 541,450. Divided and this application Jan. 14, 1969, Ser. No. 792,899

Int. Cl. G08b *3/10*

U.S. Cl. 340—384 4 Claims

ABSTRACT OF THE DISCLOSURE

A circuit for providing audible feedback to the operator of a key-operated device for recording data on, for example, magnetic tape. When each key is depressed, feedback in the form of a "click" sound is provided. An error condition is signalled to the operator by a continuous tone which is not as loud as the above "clink." The circuit comprises a driving oscillator connected to an audio speaker. The oscillator is enabled for a short period when a key is depressed and continuously when an error condition occurs.

This is a division of application Ser. No. 541,450, filed on Mar. 30, 1966, now Pat. No. 3,483,523.

This invention relates generally to computing apparatus, and has particular reference to a novel data recording machine in which a series of characters keyed into the machine is subsequently recorded on magnetic tape or compared against a series of characters previously read from magnetic tape.

Electronic computer systems can operate most efficiently when the information to be processed is available on magnetic tape. Prior to the development of the machine of the invention, two machines—a card punch and a key verifier—have usually been used to record information in computer systems. In the data recorder in which the invention is utilized, business and scientific data can be manually recorded and verified on magnetic tape without the need for any intermediate medium.

The data recorder can operate in either an entry mode of a variety mode, and format programming flexibility is provided for each. In addition, a search mode permits location of any specific block of information. The programming system of the data recorder provides all of the automatic features available in card punch machines and performs all functions hundreds of times faster. Duplication of information common to a number of unit records occurs at microseconds per column speed from program or operator control. This speed, like the speed of skipping and automatic verification, contributes greatly to the overall high speed operation of the machine and further enhances the operator's ability to keep eye stroke rhythm even and easy.

The correction of errors which are sensed as soon as they are made has always been a problem for users of card punch machines. The operator knows the error exists but a non-erasable hole has been punched. In a data recorder to be described, the problem can be corrected quickly and easily since the operator needs only to backspace and key in the correct data. This is possible because keyboard entries always go first to a correctable electronic memory and then to the record tape.

Very briefly, the data recorder in which the invention is utilized includes a keyboard which permits entry of 63 different character codes including alphabet, numerics and special characters. The output media is in the form of a seven channel magnetic tape, and up to 80 data characters can be recorded in each unit record. A magnetic core memory is used to store data to be recorded in a unit record during a recording run; and also to store program patterns. In the entry mode, keyed data is entered into memory until the machine is signalled that the data record is complete. The data is then read (but not erased) from memory and written on the tape after which the tape is backspaced the length of the record just written and the record is read from the tape and compared with the data as it is in memory. In the verify mode, a unit record of data is entered into memory from the tape being verified. The verify operator then transcribes data from the source media and as each character is entered it is compared with the information in memory. Any difference is signalled to the operator.

In key operated mechanical and electro-mechanical devices, a feedback relation exists between the machine and operator which is due in a large measure to the machine noise that is directly or indirectly caused by the actuation of a key. This feedback relation is essential in establishing a smooth operator cadence. In key operated electronic devices, mechanical actuation noises may be completely absent and it has been found that when this is the case key actuation noise must be supplied by artificial means for successful operation of the device. Further, it has been found that the artificial sound must closely simulate the normally encountered mechanical sound to which the operator is accustomed.

Another part of the feedback relation that is very important is the notice of an incorrect key depression that may be given to the operator. Thus, in conventional mechanical and electro-mechanical keyed devices the feedback may be due to a mechanical interlocking of the keyboard which then prevents subsequent key depression. This does not lend itself to electronic devices in that there are no mutual mechanical connections between the individual keys.

The actuating sound of a mechanical or electro-mechanical device can best be described as a "click." A very straight forward means for providing this sound would be the actuation of an electromagnet to provide a mechanical impact similar to that which would be encountered in a mechanical device. However, the response time of such a device is relatively slow compared to the potential operating speeds of the keyboard. It has the further disadvantage of a relatively high peak power requirement. The generation of a click sound by conventional acoustic techniques such as a speaker presents problems in that a click is a very low frequency sound and the efficiency of an economical speaker falls off drastically at these low frequencies.

It is therefore an object of the invention to provide a common electronic circuit for use in a keyboard-controlled machine to generate an audible key-action response signal and an audible error alarm signal.

In accordance with the invention, a speaker is driven with a burst frequency which is within the efficient range of the speaker but sounds to the human ear as a click. The same circuitry, including the speaker, is then used as an error alarm by energizing it continuously, causing emission of a humanly audible high frequency tone.

The operation of this circuit, accordingly, is arranged so that the depression of a key enables a driving oscillator for a short period sufficient to create the click sound, and if the key depression is erroneous the driving oscillator is simply held on until the operator responds to the error condition.

A preferred embodiment of the circuit of the invention is illustrated in the drawing, which is a schematic circuit diagram of what may be generally classified as an oscillator connected to an audio speaker.

Referring to the drawing, a permanent magnet speaker 248 is connected in parallel with a 2.2K register 249. The speaker transforms electrical energy into acoustical energy and provides an inductance necessary for the operation of the oscillator. The oscillator comprises a pair of PNP transistors 253 and 258 and an NPN transistor 257 inter-connected as shown.

In the quiescent state, the inputs at terminals 250 and 252 are at a negative potential of a nominal 10 volts. Input signals K/SPR and KBD LO appear at the terminals 250 and 252 to signal depression of a key and occurrence of an error condition, respectively. These signals are fed from various machine control circuits not a part of the invention and therefore not herein shown or described. With terminal 250 at −10 volts, transistor 253 is in a conducting state by virtue of base current from resistors 254 and 255. With transistor 253 conductive, its collector potential is closed to ground potential and capacitor 256 is essentially discharged; also, current is not available to the emitter of transistor 257 and consequently not to the base of transistor 258. The latter two transistors are thus both non-conductive.

With terminal 252 still at a nominal potential of −10 volts and transistors 257 and 258 non-conductive, the collector of transistor 258 and base of transistor 257 are at a nominal negative potential of 15 volts as determined by the ratio of:

$$\frac{R259(R260+R262)}{R259+R260+R262}$$

The resistor 263 provides a path for possible collector to base leakage current in transistor 258 thus precluding thermal instability. With the terminal 250 at a nominal potential of −10 volts, capacitor 264 is charged to a nominal 10 volts.

When a key is depressed generating a keyboard sprocket (K/SPR) signal, it causes the input at terminal 250 to be switched from its quiescent level of −10 volts to essentially ground potential. This positive transition is coupled via capacitor 264 to the base of transistor 253 causing it to turn off. Transistor 253 will then remain off until capacitor 264 discharges to a particular value or terminal 250 is switched back to its quiescent potential of −10 volts, whichever occurs first. When transistor 253 turns off, the current through resistor 265 now causes capacitor 256 to charge toward a potential of −30 volts. However, when this capacitor charges to a potential more negative than the quiescent potential at the base of transistor 257, the latter becomes forward biased and conductive, diverting current to the base of transistor 258 making it conductive.

The drop in the collector potential of transistor 258 increases the forward bias of transistor 257 which increases the current to transistor 258 and thus establishes positive feed back. As a result transistors 257 and 258 rapidly enter heavy saturation and the emitter of transistor 257 assumes a potential near ground. Capacitor 256 then discharges through the speaker coil producing acoustical energy i.e., the burst frequency previously referred to. Capacitor 256 and the inductance of the speaker now act as a resonant circuit in series with the emitter of transistor 257 with the result that when the charge on capacitor 256 is equal to the voltage drop between the collector and emitter (VCE) of transistor 257 plus the voltage drop between the emitter and base (VEB) of transistor 258, the inductor rings thus driving the emitter of transistor 257 positive with respect to its base whereby the transistor turns off.

When transistor 257 turns off, the base of transistor 258 is reverse biased and it also turns off with the result that its collector potential falls toward its quiescent value of −15 volts. This feed back action again results in a rapid transition from the conducting to non-conducting state of transistors 257 and 258. With transistors 257 and 258 non-conducting, capacitor 256 again charges toward −30 volts and a new cycle is initiated. This operation continues until transistor 253 again becomes conductive at which time the oscillator circuit assumes its quiescent state.

The discharge period of capacitor 256 is approximately $$\frac{1}{4\pi\sqrt{LC}}$$

and the charge period is approximately:

$$\frac{R259}{R260+R259+R262}=\epsilon^{-\frac{t}{C256\cdot R265}}$$

where $\epsilon$ equals the natural log base and $t$ equals time.

The power input to the speaker per cycle is approximately:

$$P=1/2\,C256\left[\frac{30\,R259(R260+R262)}{R260+R259+R262}\right]^2$$

To generate a steady tone for the error alarm, terminal 252 is switched from its quiescent state of −10 volts to ground, this transition being caused by the setting of the keyboard lockout flip-flop. This causes transistor 253 to turn off and effectively shunts resistor 262 to ground potential. The operation of the circuit is now identical to that of the burst operation except that the trigger point of transistor 257 is lowered. This results in a shorter charge period for the timing capacitor 256 and less energy input to the speaker coil, thus decreasing the loudness of the error tone in relation to the peak level of the burst.

While the circuits and logic diagrams disclosed in the drawings show transistors as being of a specific PNP or NPN type, and also refer to various inputs and signals as switching from a low to a high state or vice versa, it will be understood that the polarity can be reversed in any circuit without making a material change in the arrangement or operation of the circuit.

It will be appreciated that additional changes in the form and details of the above described preferred embodiment may be effected by persons of ordinary skill without departing from the true spirit and scope of the invention.

What is claimed is:

1. In a data recording machine of the character described including a keyboard, an oscillator circuit comprising: a speaker and a resistor connected in parallel, a first transistor having its collector connected to one side of said speaker-resistor combination and its base to an input terminal, the potential at said terminal being such that when the circuit is in its quiescent state said transistor is conductive, a capacitor connected between the collector of said first transistor and a point of reference potential, said capacitor being essentially discharged when said first transistor is conductive, a second transistor having its emitter connected to the other side of said speaker-resistor combination, a third transistor having its base connected to the collector of said second transistor and its collector connected to the base of said second transistor, said second and third transistors being non-conductive when the circuit is in its quiescent state, the depression of a key being operable to switch the potential at said input terminal from a low to a high state whereby said first transistor is rendered non-conductive, means operable when said first transistor is non-conductive to charge said capacitor thereby causing said second transistor to be conductive and pass current to said third transistor making it conductive also, said reciprocal base-collector connection between said second and third transistors causing positive feed back and heavy saturation whereby the emitter potential of said second transistor is altered so that said capacitor discharges through said speaker with a high energy input and produces acoustical energy.

2. A circuit as defined in claim 1 including a keyboard lockout flip-flop, a second input terminal operably connected to the base of said first transistor, a second resistor connected between said second input terminal and the point of reference potential, and means connecting the base of said second transistor to said second resistor at the input terminal side thereof, said flip-flop being set by an erroneous key depression, the potential at said second input terminal being switched from a low to a high state in response to the setting of said flip-flop causing said first transistor to become non-conductive and effectively shunting said second resistor to the reference potential whereby said second and third transistors are rendered conductive, said second transistor having a lower trigger point when it is made conductive as a result of a positive transition at said second input terminal than when it is made conductive as a result of a positive transition at said first input, said lower trigger point causing said capacitor to have a shorter charge period so that the energy input to the speaker is less and the resultant tone is not as loud.

3. An oscillator circuit for operating an inductance-type audio speaker comprising, in combination:

a resistor connected across first and second terminals of the coil of said speaker:

a source of reference potential;

a source of supply current;

a first transistor operable during conduction to shunt said supply current to said source of reference potential and operable during non-conduction to divert said supply current to said first terminal of said coil;

a capacitor bridging said reference source and said first terminal of said coil; and a second transistor connected at its emitter to the second terminal of said coil and at its base to a bias voltage of a predetermined magnitude, the collector of said second transistor being connected to supply a voltage substantially equal to said reference voltage, whereby the placing of said first transistor into a state of non-conduction initiates charging of said capacitor and concomitantly alters the voltage level at the emitter of said second transistor until the base-emitter junction of the latter becomes forward biased, whereupon said capacitor discharges through said second transistor in so doing causes a resonant interaction between said coil and said capacitor, which interaction generates an audio output from said speaker and alters the voltage at the emitter of said second transistor, switching said transistor back into a state of non-conduction whereby said resonant interaction is terminated and said capacitor recharges to begin another cycle of oscillation.

4. The circuit set forth in claim 3, further comprising:

first and second input circuits connected to the base of said first transistor, each said input circuit being selectively operable to control the state of conduction of said first transistor and thus control the output from said speaker, said second input circuit additionally comprising means for changing the voltage level at the base of said second transistor whereby the characteristics of said audio output are variable in accordance with the selection of said input circuits.

References Cited

UNITED STATES PATENTS 3,221,317 11/1965 Ferrigno.
3,324,408 6/1967 Chapman et al.

ALVIN H. WARING, Primary Examiner

M. SLOBASKY, Assistant Examiner

U.S. Cl. X.R.

331—111, 165

PO-1050
(5/69)

UNITED STATES PATENT OFFICE
CERTIFICATE OF CORRECTION

Patent No. 3,541,548 Dated November 17, 1970

Inventor(s) George R. Cogar et al

It is certified that error appears in the above-identified patent and that said Letters Patent are hereby corrected as shown below:

In the Heading and in column 1, line 28:

The filing date of U. S. Patent No. 3,483,523 originally given as "March 30, 1966"

should read "March 3, 1966"

Signed and sealed this 1st day of May 1973.

(SEAL)
Attest:

EDWARD M. FLETCHER, JR.
Attesting Officer

ROBERT GOTTSCHALK
Commissioner of Paten